(12) United States Patent
Fekete et al.

(10) Patent No.: US 6,403,003 B1
(45) Date of Patent: Jun. 11, 2002

(54) INJECTION MOLDED DOLL HEAD

(75) Inventors: Ferenc Fekete; Sui Kay Wong, both of Hong Kong (HK)

(73) Assignee: Jetta Company Limited, Hong Kong (HK)

( * ) Notice: Subject to any disclaimer, the term of this patent is extended or adjusted under 35 U.S.C. 154(b) by 0 days.

(21) Appl. No.: 09/371,484

(22) Filed: Aug. 10, 1999

(51) Int. Cl.$^7$ ................................................ B29C 45/00
(52) U.S. Cl. ...................... 264/129; 264/277; 264/278; 264/318; 264/328.1; 264/335; 425/DIG. 57; 425/DIG. 58
(58) Field of Search ................................. 264/129, 318, 264/334, 335, 328.1, 275, 277, 278; 475/DIG. 57, DIG. 58

(56) References Cited

U.S. PATENT DOCUMENTS

| | | | |
|---|---|---|---|
| 2,093,909 A | * 9/1937 | Dodge | .......................... 18/47.5 |
| 2,152,311 A | 3/1939 | Jacobson | |
| 2,601,741 A | 7/1952 | Cohn et al. | |
| 2,601,742 A | 7/1952 | Kusold | |
| 3,106,040 A | 10/1963 | Ostrander | |
| 3,701,821 A | 10/1972 | Barnes | |
| 3,856,256 A | 12/1974 | Celesti | |
| 3,955,312 A | 5/1976 | Pugh | |
| 3,964,415 A | 6/1976 | Viker et al. | |
| 4,101,619 A | 7/1978 | Conway et al. | |
| 4,130,264 A | 12/1978 | Schröer | |
| 4,143,453 A | 3/1979 | Taluba | |
| 4,286,942 A | 9/1981 | Fuzioka et al. | |
| 4,450,129 A | * 5/1984 | Dunn et al. | .................. 264/134 |
| 4,731,014 A | 3/1988 | Von Holdt | |
| 4,789,326 A | 12/1988 | Sorensen | |
| 4,844,405 A | 7/1989 | Sorensen | |
| 4,935,188 A | 6/1990 | Sorensen | |
| 4,948,641 A | 8/1990 | Shantz et al. | |
| 5,062,208 A | 11/1991 | Goforth | |
| 5,261,665 A | 11/1993 | Downey | |
| 5,380,185 A | 1/1995 | Shishido et al. | |
| 5,407,341 A | 4/1995 | Endo et al. | |
| 5,433,912 A | 7/1995 | Schulz et al. | |
| 5,483,027 A | 1/1996 | Krause | |
| 5,490,966 A | 2/1996 | Peterson et al. | |
| 5,650,115 A | 7/1997 | Proos et al. | |
| 5,683,644 A | * 11/1997 | Peterson | ..................... 264/318 |
| 5,700,415 A | 12/1997 | Hiroki et al. | |
| 5,710,184 A | 1/1998 | Burns | |
| 5,849,377 A | 12/1998 | Horikoshi et al. | |
| 5,922,252 A | 7/1999 | Stanton et al. | |
| 5,925,425 A | 7/1999 | Nelson | |

FOREIGN PATENT DOCUMENTS

| | | |
|---|---|---|
| GB | 2 318 523 A | 4/1998 |
| JP | 401046496 A | 2/1989 |

OTHER PUBLICATIONS

Shell Chemical—Online Literature, Kraton™ Polymers Processing Guide, 1–27 (1998).
PCT International Search Report, dated Dec. 27, 2000, for corresponding application, Serial No. PCT/US00/40605.

* cited by examiner

*Primary Examiner*—Jan H. Silbaugh
*Assistant Examiner*—Edmund H. Lee
(74) *Attorney, Agent, or Firm*—Brinks Hofer Gilson & Lione (57) ABSTRACT

The invention provides a method for making a hollow doll's head by injection molding a thermoplastic elastomer around a removable mold core. The major dimension of the mold core is larger than the opening in the doll's head through which the core is to be removed after the injection molding is complete. For large mold cores and relatively small openings, the invention provides a multiple piece core section which is designed to be removed piece by piece through the opening in the doll's head and then reassembled for reuse.

22 Claims, 5 Drawing Sheets

INJECTION MOLDED DOLL HEAD

BACKGROUND OF THE INVENTION

The present invention relates to hollow toy parts and, in particular, to soft hollow doll heads. The invention also relates to a method for making soft, hollow toy parts with thermoplastic elastomers, and to the molds used in those methods.

Traditionally, soft, hollow toy parts or doll heads were made by either by slush molding, dip molding, or rotocasting processes using latex or PVC, or by blow-molding processes using thermoplastic elastomers. These traditional processes, however, are not able to make hollow parts with controllable and precise wall thicknesses and opening dimensions. Nonetheless, due to the softness and easy processing of PVC, slush molding and rotocasting processes using PVC have been the primary process and the primary material for making one-piece hollow doll heads with direct hair rooting in the past half century.

In the last decade, however, various research has indicated that PVC material is not environmentally friendly, and more importantly, it may also be harmful to one's health. As a result, some toy manufacturers have been asked to stop using PVC in toys and dolls. Accordingly, there is a need for new materials that are not harmful and do not cause environmental concerns for use in making toys. As well, there is a need for a new process for making soft hollow toy parts with controllable and precise wall thicknesses and opening dimensions.

BRIEF SUMMARY OF THE INVENTION

The present invention provides a solution to the aforementioned needs. In one aspect of the invention, a method is provided for making a soft hollow part for a toy, such as a head for a doll. The method includes providing an injection moldable flexible thermoplastic elastomer, and providing a mold for the head part. The mold includes exterior mold parts and an interior core part, wherein the exterior mold parts are spaced apart from the interior core to define a cavity in the shape of the hollow part to be formed. The thermoplastic elastomer is injected into the mold cavity to form the hollow head. The head has an opening for removing the interior core, but the dimension of the core is larger than the dimension of the opening through which the core must be removed. After the head is injection molded, the exterior mold parts are opened to release the head and interior core, and then the interior core is removed from the head by extracting it through the opening in the head.

Preferably, this method uses a non-PVC thermoplastic elastomer. In particular, a family of flexible thermoplastic elastomers known as S-B-S (Styrene-Butadiene-Styrene), S-I-S (Styrene-Isoprene-Styrene) and S-EB-S (Styrene-Ethylene/Butylene-Styrene), marketed by Shell Chemical Company under the name KRATON, is preferred because of its resilience, strength and durability, as well as the ability to be painted and passing the general paint adhesion requirements for toys and dolls applications. S-B-S copolymer, such as marketed as KRATON D, is the more preferred elastomer. This copolymer is reported to be environmentally friendly, and not harmful to people's health.

In a second aspect of the invention, a mold is provided for making an injection molded hollow article, such as a doll head, using a thermoplastic elastomer. The mold includes an exterior mold portion and an interior core assembly. The exterior mold portion includes at least separable two sections for enclosing the interior core assembly. The interior core assembly fits inside the exterior mold portion. The interior core is spaced apart from the exterior mold portion to define a variable-thickness cavity having the shape of the hollow article to be molded and into which a melted thermoplastic elastomer may be injected to form the hollow article. The hollow article takes the shape of the cavity and includes an opening through which the interior core is removable. The interior core assembly has a cross-sectional dimension that is larger than the dimension of the opening in the hollow article from which it must be removed after the article is molded. Accordingly, this mold is useful for making a variety of hollow toy parts that have a narrow opening, such as heads, feet, hands, etc.

In a third aspect of the invention, an injection-molded hollow doll head is provided. The hollow doll head is made of an injection-moldable thermoplastic elastomer. The doll head has an exterior surface defined by an opposing surface of an exterior mold, and an interior surface defined by an opposing surface of an interior mold core during the injection molding process that formed the head. The interior surface of the hollow head defines a hollow interior of the head that is in communication with an opening at the bottom of the head. The hollow interior has a major hollow dimension larger than the dimension of the opening.

In one embodiment, the doll head preferably includes a pull-tab projecting from the top of the head. When the head is injection molded, a part line is created at the junction of two exterior mold halves. The part line extends along the lateral edges of the pull-tab, across the ears and down the sides of the he ad to the opening.

In another embodiment, the doll head is made without an observable part line. When the head is injection molded, a part line is created at the junction of two exterior mold halves. The part line extends in a continuous line around the top of the head above the ears. Hair-material is rooted to the top of the doll head above and below the part line with a sufficient density such that the part line is not observable to an ordinary observer holding the doll at arms length.

Figure 4:
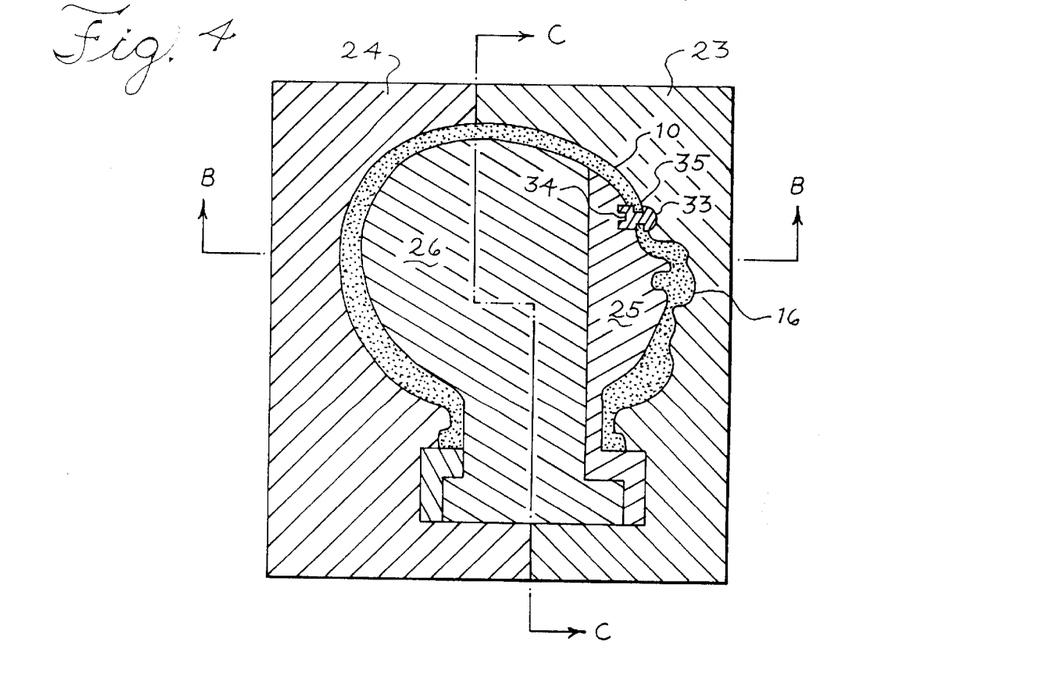
FIG. 4 is a cross-sectional view of a variation of the doll's head of FIG. 1 with an overmolded object captured in the head.
Figure 5:
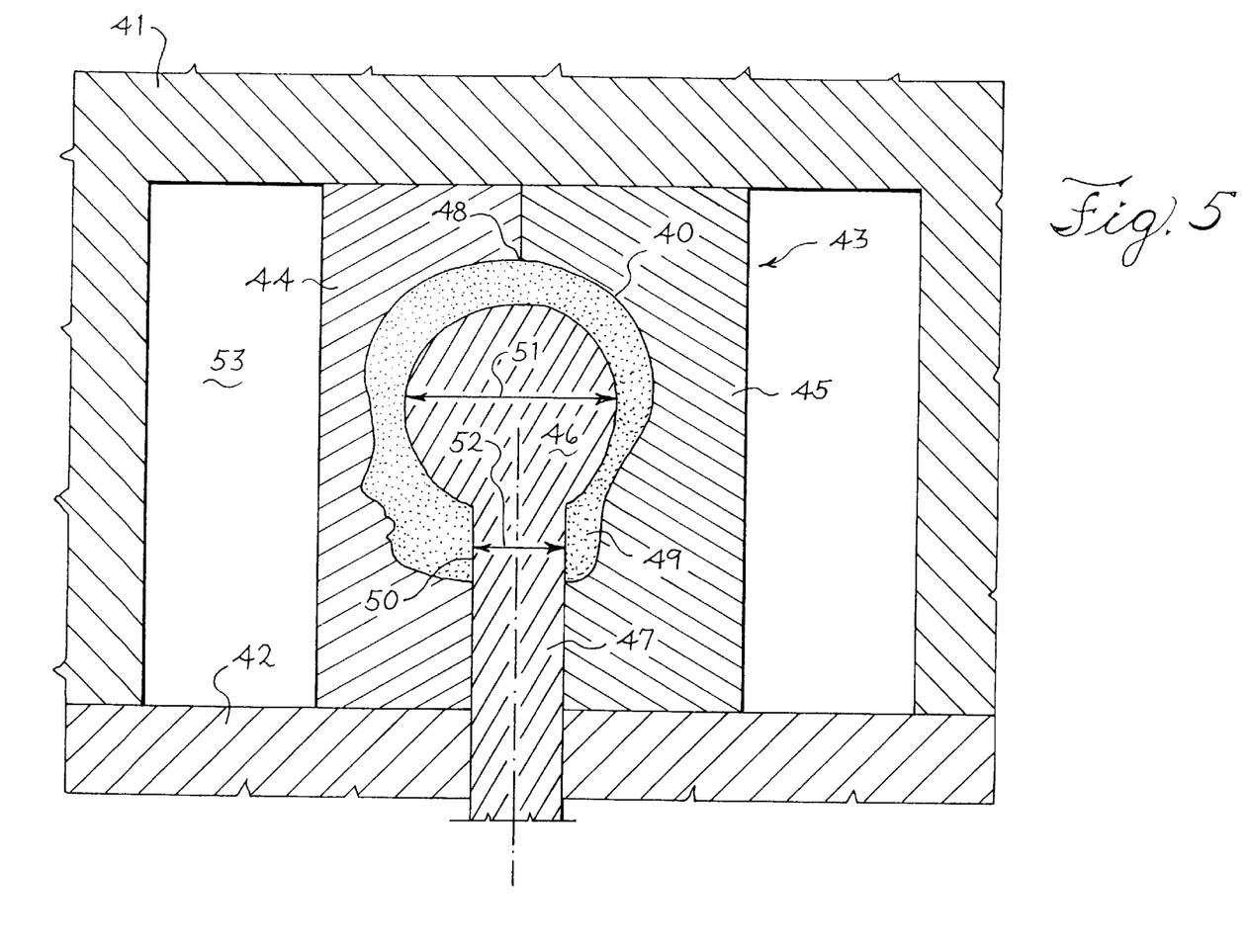
FIG. 5 is a cross-sectional view of a second embodiment of a doll's head inside a mold.
Figure 6:
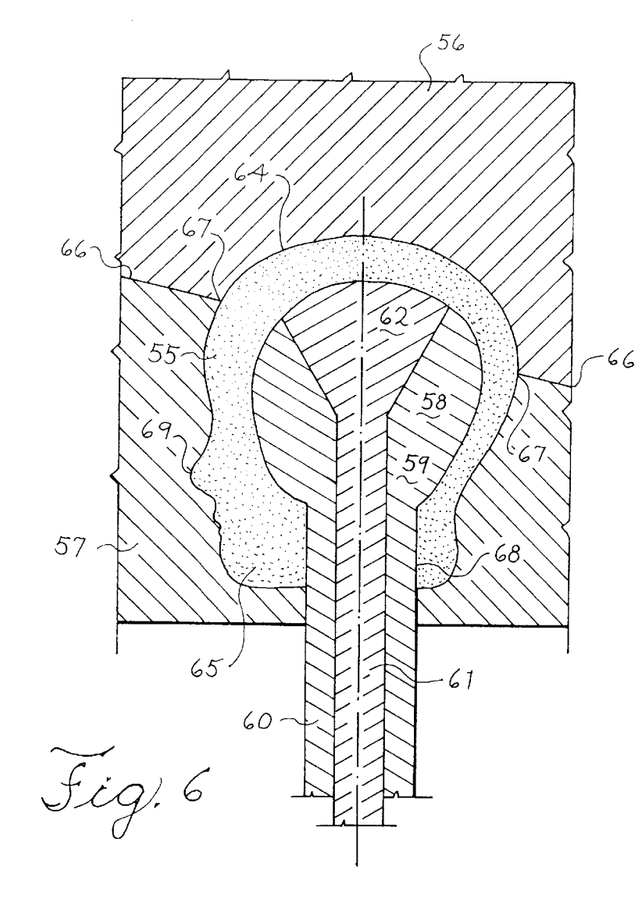
FIG. 6 is a cross-sectional view of a third embodiment of a doll's head in a mold.
Figure 7:
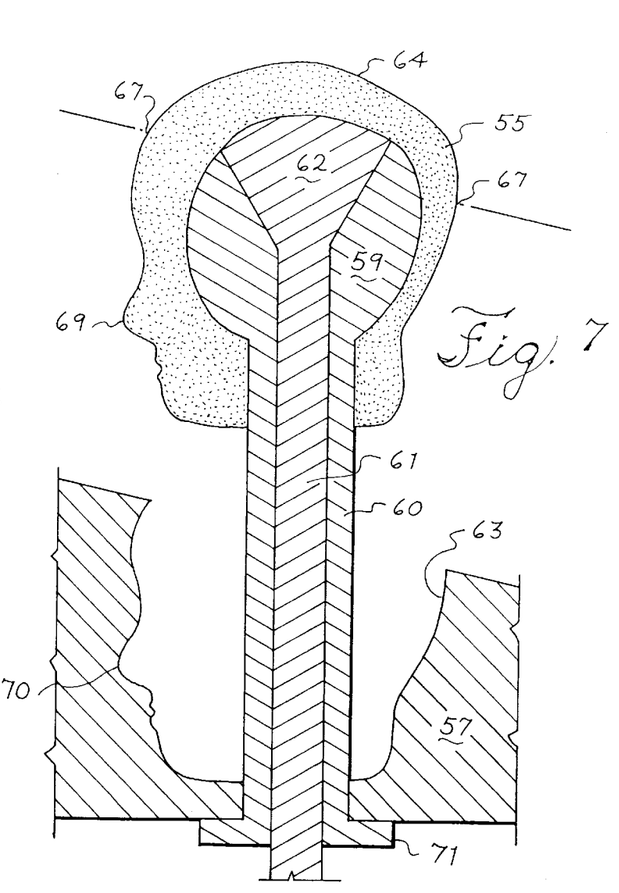
FIG. 7 is a cross-sectional view of the doll's head of FIG. 5 being removed from the lower mold half.
Figures 8, 9, 10:
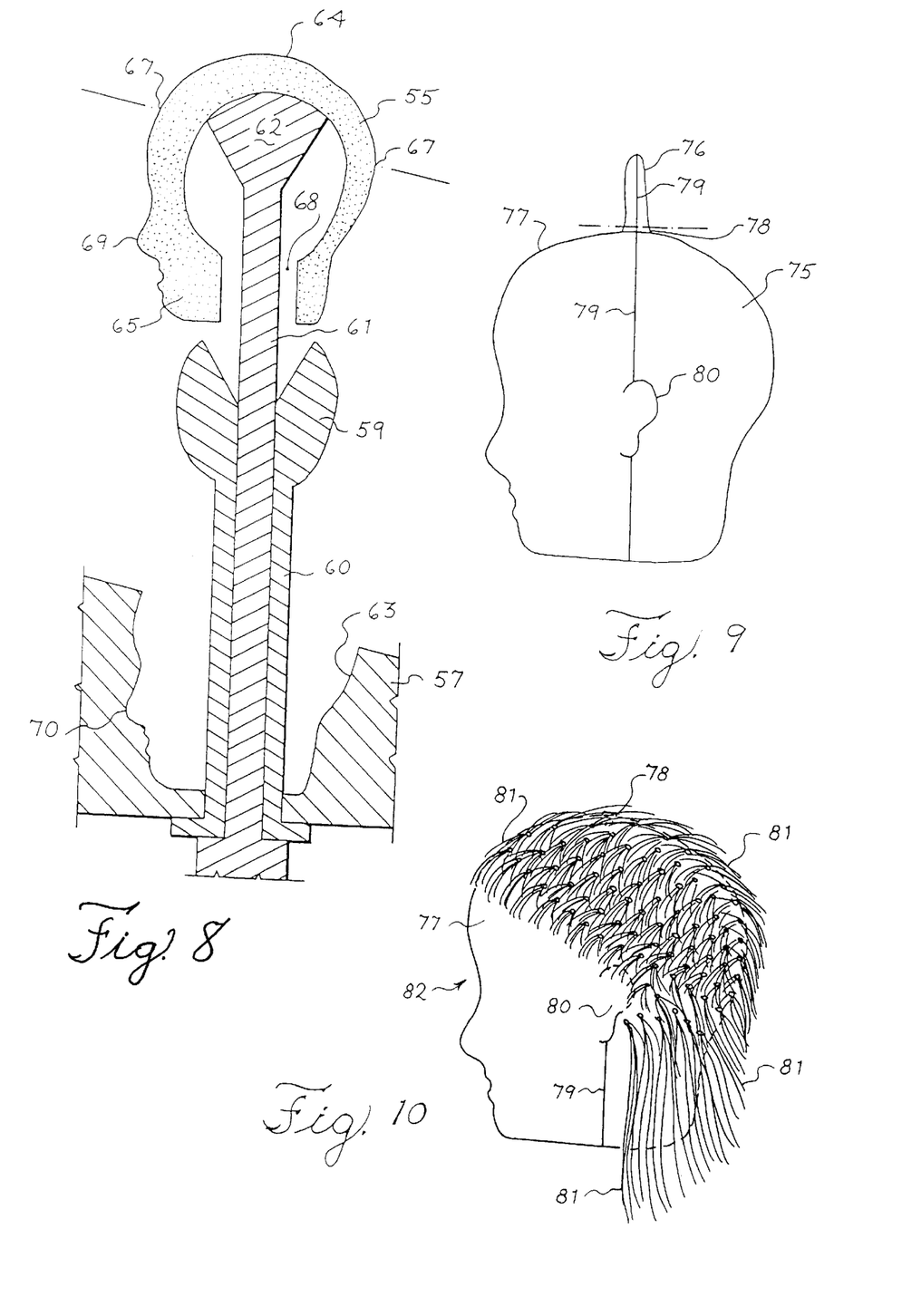
FIG. 8 is a cross-sectional view of the doll's head of FIG. 6 being ejected off the core.
FIG. 9 is the cross-sectional view of a fourth embodiment of the doll's head.
FIG. 10 is a side elevation view of the doll's head of FIG. 9 after hair is rooted to the head.

Preferably, the invention takes advantage of certain mold structures to make the soft hollow parts and dolls heads. A multi-piece removable and splitable solid interior core assembly may be used to mold soft hollow parts with a major hollow dimension significantly larger than the removal opening dimension, as shown in FIGS. 1–4. A one-piece solid core may be used to mold soft hollow parts or doll heads with a major hollow dimension larger than the removal opening, as shown in FIG. 5. A two-part solid core design with a mushroom-shaped ejector pin, double-ejection system may be used to locate the parting line at the top part of head within the hair rooting area, as shown in FIGS. 6–8, to make the part line not observable to the ordinary observer. A pull tab may be molded on the doll head to assist with removal of the head from the interior core, as shown in FIG. 8.

The process of this invention allows a toy manufacturer to make soft hollow toy parts and doll heads using thermoplastic elastomers with several advantages over the traditional processes. First, controllable and precise wall thicknesses can be achieved at specific locations. Second, by the use of multi-piece interior cores, there is no virtual limit on the undercut ratio of the hollow interior to the core removal opening. Third, all kinds of injection moldable thermoplastic elastomers can be used, especially, environmentally friendly and non-harmful materials.

These and other features and advantages of the invention will be apparent and fully understood from the following Detailed Description of the Preferred Embodiments of the Invention, taken in connection with the appended drawings.

DETAILED DESCRIPTION OF THE PREFERRED EMBODIMENTS OF THE INVENTION

With reference to the above-identified drawings, the detailed description of the preferred embodiments of the invention will be provided. The directional terms front, rear, left, right, top, bottom, height, width, etc., are provided from the viewpoint of the normal upright position of the doll head taken from the doll's perspective, and are used herein as an aid to identify and describe the different features of the preferred embodiments of the invention. Those directional terms are not meant, however, to limit the invention in any respect.

Also, the invention is described with respect to the preferred embodiment of a doll head. However, that term is not meant to be limited to any particular type of toy doll, and not limited to human characters. As used herein, the term "doll head" could be the head of any toy, figurine, souvenir, animatronic robot, and the like, that represents a human figure, an animal, living or extinct, or even a fictitious character of unknown origin, such as an alien from another planet.

Figure 1:
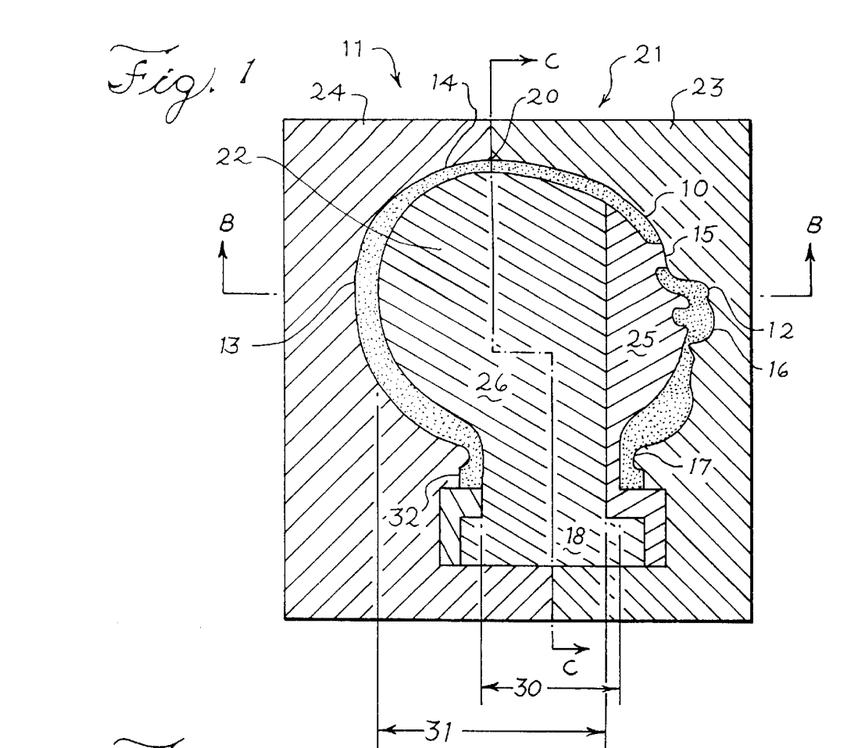
FIG. 1 is a front-to-back cross-sectional view of the doll's head inside a mold.
Figure 2:
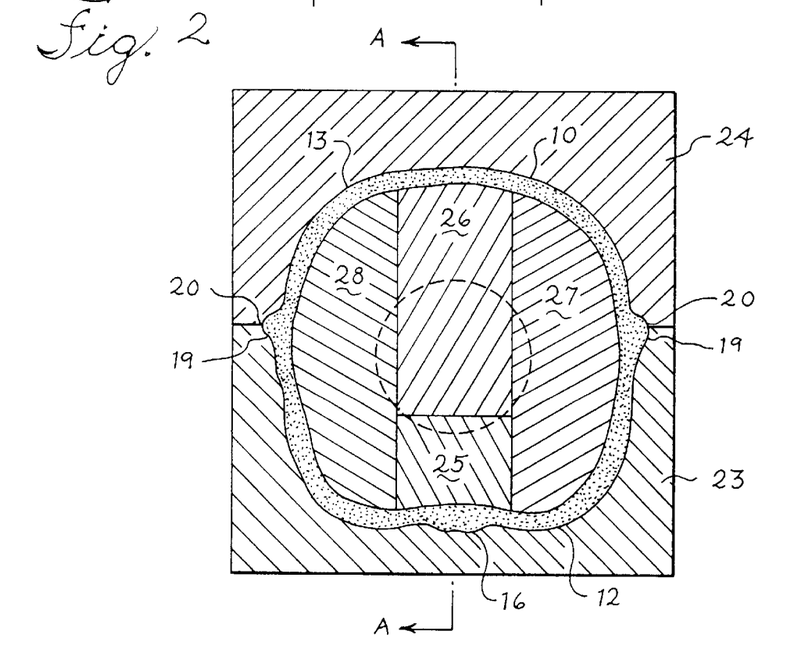
FIG. 2 is a cross-sectional view of the doll's head of a mold of FIG. 1 taken across lines B—B.
Figure 3:
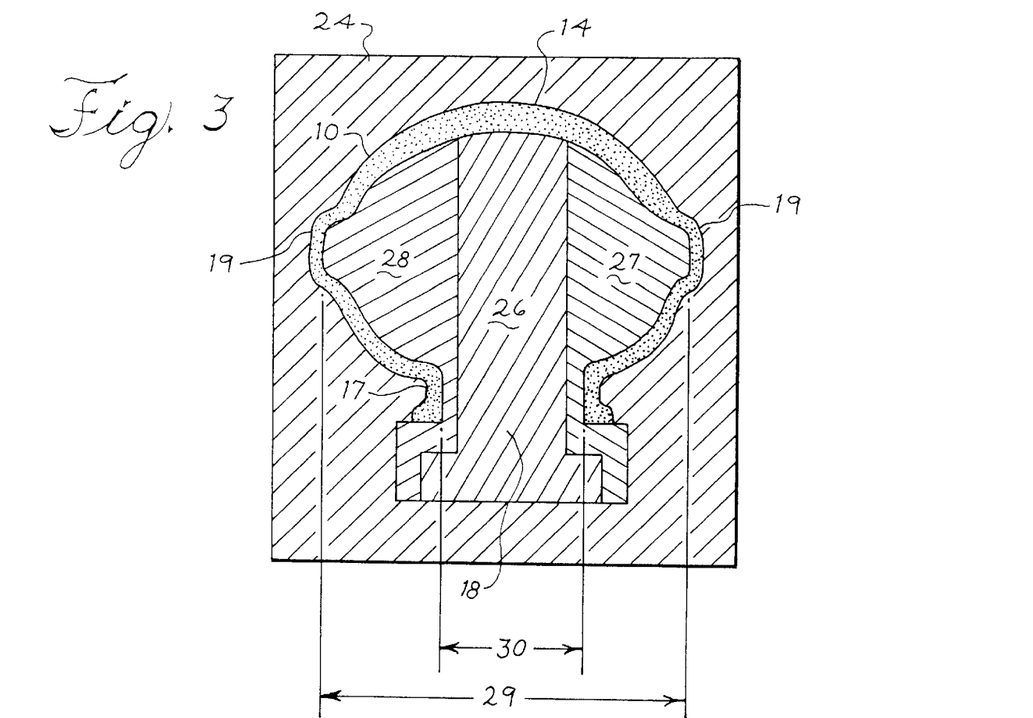
FIG. 3 is a cross-sectional view of the doll's head of FIG. 1 taken across lines C—C.

FIGS. 1, 2, and 3 illustrate one preferred embodiment of the invention. A hollow doll head 10 is depicted in a two-part injection mold 11. The head is defined by the gap between the two parts of the mold, and formed by injection molding a melted thermoplastic elastomer into that gap. Notable features of the head includes the face 12 or front of the head, the back 13 of the head, the top 14 of the head, the eye socket 15, the nose 16, the neck 17, the neck opening 18, the ears 19, and the part line 20.

The two-part injection mold 11 includes an exterior mold portion 21 and an interior core assembly 22. The exterior mold portion is itself made of two mold halves: a front mold half 23, and a rear mold half 24. The front mold half 23 is so-called because it is cut to define the features of the front 12 of the doll head, and the back mold half 24 is so-called because it is cut to define the features of the back 13 of the doll head. The two exterior mold halves 23, 24 come together around the widest portion of the head and, due to normal injection molding processes, form the part line 20 on the doll head at that junction.

The interior core assembly 22 is composed of four separate solid core pieces. The core assembly 22 includes a front center core section 25, a rear center core section 26, a left core section 27, and a right core section 28. Those core sections, or pieces, assemble, preferably in an interlocking manner to hold together, to form the interior shape and surface of the hollow interior of the doll head. Assembled, the interior core assembly 22 has a major hollow dimension 29 (i.e., the largest width dimension of the core assembly) that is larger than the opening dimension 30 in the neck. Preferably, the individual core pieces have a major piece dimension 31 (i.e., the largest width dimension of the core piece) that is smaller than the major hollow dimension 29. More preferably, the core pieces have a major piece dimension that is about the same size as the opening dimension 30 in the neck.

As can be seen in FIGS. 1–3, the head 10 is formed in the gap created between the interior core assembly 22 and the exterior mold 21. This interior/exterior two-part molding technique can be used to define precise wall thicknesses at specific locations in the head. For example, the wall thickness may be varied by sculpting the exterior mold to create specific facial features, such as a nose 16. Likewise, the thickness may be easily controlled around the neck 17 to create a wide flange 32 at the base of the neck that may provide for secure attachment of the doll head to a doll body (not shown).

Moreover, another advantage of this molding technique is the ability to form openings anywhere in the head. For example, FIG. 1 depicts an eye socket 15 located where the front center core piece 25 contacts the exterior mold half 23. This closes the gap between the two parts so that no melted thermoplastic elastomer can flow there.

Taking this feature further, removable objects may be located between the interior and exterior mold parts, which would be overmolded by the injected thermoplastic and captured by the formed doll head. FIG. 4 shows this variation of the doll head of FIG. 1. In this variation, an eye bead 33 may be placed on a post 34 in the front center core piece 25. The core assembly 22 and eye bead 33 are placed within the exterior mold 21. When the melted thermoplastic is injected, it flows around the eye bead 33 and into an optional groove 35 in the eye bead to create a retaining overmold. When the molds are removed from the head, the eye bead slips off the post and is permanently retained in the head. Alternatively, to retain the eye bead, it may be made of a material compatible with the elastomer used for the doll head so that the eye bead surface would melt and adhere to the doll head material.

A typical molding procedure for use with the mold shown in FIGS. 1–3 is as follows. The core pieces 25, 26, 27 and 28 are assembled, and interlocked, and placed in the first mold half. Then the second mold half is closed over the first mold half and held tightly together to prevent injected plastic from forcing the mold halves apart and squeezing out from the cavity. Melted thermoplastic elastomer is injected and fills up the cavity defined by the gap between the interior and exterior mold parts. After the thermoplastic cools down and is solidified, the first mold half is opened, and the head with the core assembly inside it are pulled out of the second mold half.

The interior core assembly is then removed from the head. First, the rear central core piece 26, which predominantly sits over the neck opening 18, is removed. Then, the front central core piece 25 is pulled back from the front of the head 12 and pulled out through the opening 18. Then the left and right core pieces 27 and 28 are removed in any sequence. After the core pieces are removed from the head, any thermoplastic residue is removed and the pieces reassembled into a core assembly for reuse in the next injection molding cycle with the cleaned exterior mold halves.

The interior core assembly may be designed for removal in any desired sequence. Preferably, the core assembly is designed with at least one key piece that must be removed first before any other pieces can be removed from the doll head. More preferably, the core assembly is designed with at least two key pieces that must be removed in a specific sequence before removing the remaining core pieces from the molded doll head. As shown in FIG. 2, because the rear center core piece lies over the opening 18, it must of necessity be removed first before the other pieces can be removed. Likewise, the front center core piece must be removed next.

The advantage to using this molding technique is that injection molding can be performed to precisely mold hollow parts with major hollow dimensions much greater than the openings through which the interior core piece or pieces are to be removed. It is believed that there is no limit on the largest undercut ratio (i.e., the ratio of the major hollow dimension to the neck opening dimension) that would work with this method for injection molding a doll head, because one may use as few as two, or more than a hundred interior core pieces to make the interior core assembly. Of course, there are practical limits to the cost effectiveness for using so many core pieces. On the other hand, one may use as few core pieces as practicable depending only on the ability of the dolls head to stretch around the major piece dimension. That ability depends on many factors, such as the flexibility of the thermoplastic elastomer, the wall thickness around the opening limiting the stretchability of the neck opening, the temperature of the material when the core is removed, etc.

Referring now to FIG. 5, a second preferred embodiment of the invention is shown. A doll head 40 is shown inside an injection molding device. The mold base 41 and the mold block 42 contain an exterior mold part 43 having a front mold half 44 and a back mold half 45. The mold halves enclose an interior core 46 that includes a core stem 47. The stem 47 extends through the mold halves 44 and 45 and connects to the mold base 41. Between the interior core 46 and the mold halves, there is a cavity defined with a variable thickness corresponding to the form of the doll head 40 that is to be molded in that cavity. The front mold half 44 and the back mold half 45 meet along the sides and top of the doll head to create a part line 48 on the surface of the head at that junction. The core stem 47 contacts the exterior mold halves at the bottom 49 of the head to define an opening 50 in the head through which the core 46 will need to be removed. The core has a major hollow dimension 51 that is larger than the dimension 52 of the opening, requiring that the opening stretch around the core 46 to allow its removal.

In this particular embodiment, the doll head is formed by placing the core 46 and stem 47 within the exterior mold halves 44 and 45. Then melted thermoplastic elastomer is injected into the cavity formed between the interior core and the exterior mold halves. After the elastomer has sufficiently cooled, the exterior mold halves 44 and 45 slide apart and the mold block 42 and core 46 are pulled out from the molding device 53 with the molded doll head 40 attached around the core 46. The hollow doll head is then removed from the core by hand with a tool, or other mold ejection assist, such as air ejection. For air ejection, a hollow conduit may pass through the center line of the core 46 and stem 47 into the hollow interior of the doll head. Air would be injected through the conduit and into the head to partially inflate and stretch it, so it can be easily removed off of the core.

Referring now to FIGS. 6–8, a third preferred embodiment of the invention is shown. This embodiment includes a double-ejector system for removal of the doll head from the mold. A doll head 55 is shown inside exterior mold halves that include a top mold half 56 and a bottom mold half 57. Inside the mold halves, there is an interior core assembly 58. The interior core assembly 58 includes a concentric core piece 59 connected to a core sleeve 60 that surrounds and slides along the ejector pin 61. The ejector pin 61 ends with a mushroom-shaped cap 62 in the concentric core piece 59. The cavity 63 between the exterior mold halves 56 and 57 and the core assembly 58 is in the shape of the doll head 55 that is formed by injection molding melted thermoplastic elastomer inside the cavity 63. The doll head has a top 64 formed in the top exterior mold half 56 and a bottom 65 that is formed in the bottom exterior mold half 57. At the junction 66 where the top and bottom exterior mold halves meet, a part line 67 is created that is substantially a continuous circle around the top 64 of the doll head and above the usual location for the ears. The doll head 55 has a hollow interior surrounding the core 58, and an opening 68 in the bottom of head through Which the core sleeve 60 and ejector pin 61 pass and contact the bottom exterior mold half 57.

As can be observed in the sequence of FIGS. 6, 7 and then 8, after forming a doll head 55 by injecting melted thermoplastic into the mold and allowing it to cool, the doll head is removed from the mold by first removing the top mold half 56. Then the core assembly 58, including the core sleeve 60 and ejector pin 61, is pushed up to force the head 55 out of the bottom mold half 57. Some force may be required to squeeze the head out from the mold half because the nose 69 must be flattened to squeeze out of the undercut portion 70 of the mold that defined the shape of the nose. Then, the core sleeve 60 is retained in a fixed position relative to the ejector pin 61. This may be accomplished by a flanged limit stop 71 on the bottom of the core sleeve 60. The ejector pin 61 is pushed upward forcing the head to slide off of the concentric core piece 59 by stretching the opening 68 in the bottom of the head around the widest part (i.e., major hollow dimension) of the core piece. Then, the doll head 55 may be easily removed from the mushroom-shaped ejector pin head 62 since it has a smaller major dimension than the annular core piece 60.

It is particularly advantageous for the doll head 55 to have a part line 67 around the top of the head. With the part line 67 located there, it is normal for the doll head to have hair-material rooted on both the top of the head and below the part line. The hair-material, which is made of any natural or synthetic material suitable to resemble hair, should have a sufficient strand density to cover the part line and to make the part line not observable to an ordinary observer holding the doll at arms length. By ordinary observer, it is meant a person holding the doll for the purpose of casual observation or play, and not for detailed inspection.

Referring now to FIG. 9, a fourth embodiment of a doll head is shown. The doll head 75 includes a pull tab 76 projecting from the top 77 of the head. The pull tab 76 is useful for grasping and pulling the head off of the interior core during the step of removing the head from the core after the injection molding process. The pull tab 76 may then be cut off leaving a tiny vestige 78 on top of the doll head. The head 82 may be rooted with hair 81 over the top of the head so that the vestige 78 is not observable. As shown in FIG. 9, as would be expected for a doll head made with molds as shown in FIGS. 1–5, the part line 79 of the head extends around the lateral sides of the pull tab 76 down across the ears 80 and down the side of the head. Alternatively, the pull-tab may also be added to molds as shown in FIGS. 6–8, in which case, the part line would circle around the top of the head.

A variety of injection-moldable flexible thermoplastic elastomers may be used with this invention. The material may in particular be selected from poly (vinyl chloride) (PVC), ethylene vinyl acetate copolymer (EVA), any of the polymers sold under the trademark KRATON by Shell Chemical Co. (such as optionally hydrogenated) styrene-ethylene/butylene-styrene (S-EB-S), styrene-butadiene-styrene (S-B-S), styrene-isopropene-styrene (S-I-S), styrene-diene, styrene-isoprene and styrene-butadiene block copolymers, styrene-ethylene-butylene block copolymer containing mineral oil, branched styrene copolymer, styrene-butadiene rubber, styrene-butadiene triblock rubber, styrene-isoprene-styrene linear block polymer, styrene-butadiene radial block copolymer, butadiene-styrene copolymer rubber, or synthetic rubber) and low density polyethylene (LDP). Another potentially suitable thermoplastic elastomer is sold by Monsanto under the name SANTOPRENE. Preferably, an S-B-S, S-I-S or S-EB-S copolymer is used. More preferably, S-B-S copolymer is used.

Preferably, the thermoplastic elastomer is sufficiently flexible to stretch and allow the larger interior core pieces to be extracted from the interior of the hollow molded parts. It is preferred to use a thermoplastic elastomer from which doll heads and other soft hollow toy parts with sufficient realism can be molded, while avoiding increased difficulty in molding detail and in removal of the molded parts from the mold, and removal of larger cores through smaller openings.

In particular, a thermoplastic elastomer marketed by Shell Chemical Company under the name KRATON D is preferred because of its resilience, strength and durability, and its ability to form a strong and reliable solvent bond (e.g., using Toluene as the solvent). KRATON D is an S-B-S block copolymer, and is reportedly suitable for food and drug use applications, making it a good choice for use in toy parts where there is concern about the harmful effects of the toy material on children.

In regard to the flexibility and stretchability of the material used to make the hollow toy parts, KRATON has an elasticity, or elongation, that ranges up to between 260% and 550%, depending on the grade selected. If a grade of elastomer is used in this invention with a higher elongation, then a larger interior core piece may be removed through a smaller opening in the toy part. The amount of force required to extract the undercut core will depend on the wall thickness of the toy part around the opening, and how much that opening needs to be stretched. The opening should not be stretched too far to prevent tearing or damage to the toy part.

Accordingly, to limit the amount of stretching and/or the amount of force required to extract the core from the toy part, it may be desirable to use, instead of a single core, a multiple-piece interior core assembly such as depicted in FIGS. 1–4. As a suggested guideline for when it may be more desirable to use a multiple-piece interior core assembly, based on experience with using KRATON D in the present invention, it is believed that for thermoplastic elastomers having a Hardness below 40 Shore A, a single core may be used with an undercut ratio up to about 3. For harder materials, with a Hardness above 40 Shore A, a single core may be used with an undercut ratio up to about 2. As stated previously, the undercut ratio is the ratio of the major hollow dimension over the opening dimension through which the core is removed. Therefore, for mold designs above those undercut ratio limits, it may be more desirable to use the multi-piece interior core assembly. As well, that undercut ratio limit is a useful guide in determining the maximum major dimensions of the individual pieces in the interior core assembly.

In the molding process according to the present invention, the injection molding processing conditions follow traditional processing parameters that depend on the type and grade of thermoplastic elastomer selected. For example, in a typical injection molding process, the bulk of the materials of the composition are thoroughly mixed to provide a uniform feedstock. The feedstock is next processed to be suitable for injection into an injection mold. In another vessel, pigment, polystyrene and a small portion of the thermoplastic elastomer (such as S-B-S copolymer) are mixed to homogeneity. The prepared feedstock and the pigment-bearing mixture are then injected into the mold, generally over a period of from about 0.02 to about 6 seconds, typically from about 0.03 to about 2 seconds, and preferably from about 0.04 to 1 second. The molding pressure is generally from about 200 psi to about 1000 psi, typically from about 300 psi to about 800 psi, and preferably from about 400 psi to about 700 psi. The molding temperature is generally from about 300° F. to about 550° F., typically from about 325° F. to about 425° F., and preferably from about 350° F. to about 400° F. The mixture is generally maintained in the mold from about 20 seconds to about 90 seconds, typically from about 30 seconds to about 80 seconds, and preferably from about 35 seconds to about 60 seconds. Further preferably, the molding is performed as quickly as possible. Further, no special venting is required.

In particular, the preferred material, KRATON D has a normal processing temperature range of 300° F. to 390° F., and a typical injection pressure of between 500 psi and 1000 psi, as noted in the Shell Chemical Technical Bulletin, SC:455–96. The injection molding methods of this invention work within the normal established processing parameters for KRATON D, and require no special processing requirements. It is also expected that other materials would not require special processing parameters to be used.

Optionally, the air in the mold at the beginning of a mold cycle may be removed from the mold by means of a vacuum assist coordinated with the injection of the elastomer composition. The vacuum assist can be applied for about the last second of the injection period, or it may be first applied after the end of the injection period. Applying the vacuum assist too early in the injection period may result in overly large cell spaces within the molded closure, yielding an overly spongy product. Failure to use a vacuum assist may result in increased cycle times.

After a time period sufficient for the overall composition to effectively harden within the mold, the mold is opened and the molded part is removed. The interior core is extracted from the part. The part may be painted with a suitable paint that is compatible with the thermoplastic elastomer used. Then, in the case of a doll head, hair may be rooted on to the part.

Molding times, pressures, venting, cooling vacuum assisting product removal, and other factors relevant to injection molding will be based upon the precise combination of materials included in the overall composition, the type, size and shape of the mold, and other factors apparent to those having ordinary skill in the art.

Of course, it should be understood that changes and modifications can be made to the preferred embodiments described above. It is therefore intended that the foregoing detailed description be regarded as illustrative rather than limiting, and that it be understood that it is the following claims including all equivalents, which are intended to define the scope of this invention.

We claim:

1. A method for making a hollow doll head, the method comprising the steps of:
   a) providing an injection moldable flexible thermoplastic elastomer;
   b) providing a mold for the hollow doll head, the mold comprising exterior mold parts and an interior core, wherein the exterior mold parts are spaced apart from the interior core to define a cavity in the shape of the hollow doll head to be formed;
   c) assembling the exterior mold parts to form a junction between the exterior mold parts such that a part line is created at the junction of the exterior mold parts when the hollow doll head is injection molded, the head having ears, the parting line forming a substantially continuous circle extending around the top of the head and above the ears;
   d) injection molding the thermoplastic elastomer into the mold cavity to form the hollow doll head, the head having an opening for removing the interior core, the diameter of the opening being smaller than the diameter of the core to pass through the opening;
   e) opening the exterior mold parts to release the hollow doll head and the interior core; and
   f) separating the interior core from the head.

2. The method of claim 1 wherein the opening is at the bottom of the head.

3. The method according to claim 1 further comprising the step of rooting hair into the head after removing the interior core.

4. The method according to claim 1 further comprising painting the head.

5. The method according to claim 1 wherein the injection moldable thermoplastic elastomer is selected from a group consisting of S-B-S copolymer, S-I-S copolymer and S-EB-S copolymer.

6. The method according to claim 5 wherein the thermoplastic elastomer is S-B-S copolymer.

7. The method according to claim 1 further comprising the steps of:
   placing a removable object onto the surface of the interior core,
   assembling the exterior mold parts around the core and removable object, and
   overmolding with the thermoplastic elastomer the removable object during the injection molding step such that the removable object is retained in the hollow head when the interior core is removed.

8. The method according to claim 7 wherein the thermoplastic elastomer overmolds only a portion of the removable object such that the removable object protrudes through the exterior surface of the hollow head.

9. The method according to claim 7 wherein the removable object is a doll eye.

10. The method according to claim 1 further comprising the step of placing at least one portion of the exterior mold part in contact with the interior core to define at least one opening to be formed in the head.

11. The method according to claim 10 further comprising, after the step of separating, the step of placing an article into at least one of said openings formed by the contact between the exterior mold part and interior core.

12. The method according to claim 1 further comprising the step of removing the head from the interior core, wherein the interior core comprises at least two separable sections, and the step of removing includes separately and individually removing each separable core section from the head through the opening.

13. The method according to claim 12, wherein at least one of the interior core separable sections is a key section that must be removed first to allow other separable sections to be later removed.

14. The method according to claim 12 wherein after the interior core separable sections are removed from the head, the sections are reassembled and replaced in the exterior mold for injection molding another head.

15. The method according to claim 1 wherein the head includes a pull tab projecting from the top of the head, and the step of separating includes grasping the pull tab and pulling the tab and head away from the interior core.

16. The method according to claim 1 wherein the interior core includes a core ejector pin and a core sleeve surrounding the pin, and the step of separating includes retaining the core sleeve in a fixed position relative to the ejector pin, and forcing the ejector pin up against the head to push the head off of the core sleeve, and removing the head from the ejector pin.

17. The method according to claim 1 wherein the interior core includes a hollow conduit in communication with the interior of the head-forming cavity, and the step of separating includes blowing a pressurized gas through the conduit and into the hollow interior of the head.

18. The method according to claim 1 wherein the mold is designed with a pre-determined ratio of the diameter of the core relative to the diameter of the opening to allow removal of the core through the opening, said pre-determined ratio being less than a maximum stretchability limit of the opening of the toy part to be formed from the flexible thermoplastic elastomer.

19. The mold according to claim 18 wherein the thermoplastic elastomer is an S-B-S copolymer, and the pre-determined ratio is more than about two.

20. The method according to claim 1 wherein the exterior mold includes two undercut portions, each undercut portion defining an ear to be formed in the head, the ears on the formed head projecting radially beyond the part line.

21. The method according to claim 1 further comprising rooting hair-material to the top of the doll head above and below the part line with a sufficient density such that the part line is not observable to an ordinary observer holding the doll at arms length.

22. The method according to claim 15 further comprising removing the pull tab from the head.

* * * * *